(12) United States Patent
Stadler et al.

(10) Patent No.: US 6,236,004 B1
(45) Date of Patent: May 22, 2001

(54) STEERING COLUMN ASSEMBLY

(75) Inventors: Peter Stadler, Aurachtal; Horst Schubotz, Wuppertal, both of (DE)

(73) Assignee: Delco Electronics Europe GmbH, Wiesbaden (DE)

( * ) Notice: Subject to any disclaimer, the term of this patent is extended or adjusted under 35 U.S.C. 154(b) by 0 days.

(21) Appl. No.: 09/381,314

(22) PCT Filed: Mar. 20, 1998

(86) PCT No.: PCT/EP98/01650

§ 371 Date: Nov. 23, 1999

§ 102(e) Date: Nov. 23, 1999

(87) PCT Pub. No.: WO98/42541

PCT Pub. Date: Oct. 1, 1998

(51) Int. Cl.$^7$ ...................................................... H01H 9/00
(52) U.S. Cl. .................................. 200/61.28; 200/61.27; 200/61.54
(58) Field of Search ............................... 200/4, 17 R, 18, 200/43.03, 43.08, 61.27, 61.28, 61.3, 61.31, 61.32–61.36, 61.54, 332, 335

(56) References Cited

U.S. PATENT DOCUMENTS

| | | | |
|---|---|---|---|
| 4,277,658 | * | 7/1981 | Delp et al. ........................ 200/61.54 |
| 4,393,280 | * | 7/1983 | Iwata et al. ............................... 200/4 |
| 5,883,348 | * | 3/1999 | Yokoyama ........................ 200/61.54 |
| 5,895,899 | * | 4/1999 | Sano ................................... 200/61.54 |
| 5,936,215 | * | 8/1999 | Masuda et al. ...................... 200/61.3 |
| 5,977,494 | * | 11/1999 | Sano et al. ........................ 200/61.54 |

FOREIGN PATENT DOCUMENTS

| | | | |
|---|---|---|---|
| 44 32 343 | 3/1996 | (DE) | ................................ H01H/21/84 |
| 195 24 153 | 1/1997 | (DE) | ................................ B60K/37/06 |
| 197 00 175 | 4/1998 | (DE) | ................................ B60R/16/02 |
| 0 675 023 | 10/1995 | (GB) | ................................ B60R/16/02 |
| 2 306 785 | 5/1997 | (GB) | ................................ H01H/27/06 |

* cited by examiner

*Primary Examiner*—Michael Friedhofer
(74) *Attorney, Agent, or Firm*—Proskauer Rose LLP

(57) ABSTRACT

A steering column assembly for arranging in the area of a steering column in a motor vehicle, comprises a locating device, a centrally arranged support board, and at least one steering column switch. The locating device comprises a receptacle for the support board and at least one laterally-aligned receptacle for the steering column switch. The support board establishes electrical connection between the connections of the steering column switch and the vehicle's control devices allocated to the steering column switch. The control devices allocated to the steering column switch are at least in part arranged on the support board. The ease of servicing such a known steering column assembly is decisively improved in that the receptacle for the support board is radially aligned and the support board can be connected to the locating device from a radial direction.

24 Claims, 5 Drawing Sheets

STEERING COLUMN ASSEMBLY

BACKGROUND OF THE INVENTION

The invention concerns a steering column assembly for arranging in the area of a steering column in a motor vehicle, comprising a locating device, a centrally arranged support board and at least one steering column switch, whereby the locating device comprises a receptacle for the support board and at least one receptacle for the switch; the switch is disconnectably connected to the locating device; the switch comprises a control, and the control, depending on its manually selectable position, by way of a control means acts upon at least one switch element causing signal indication.

Switches arranged on a steering column assembly are used to operate and control various functions of the vehicle. Such functions can, for example, be switching the vehicle lights on and off, initiating the turn signals or the windscreen wiper device, operating an automatic cruise control etc. The intention is to allow operation and control of as many functions of a vehicle as possible in close proximity to the steering wheel. Such an arrangement ensures that the driver can reach the controls without having to take whichever hand is necessary for operating the control away from the steering wheel region.

Apart from increasing operational safety, another requirement is simplification in manufacture and assembly of the elements necessary for operating and controlling the various functions. This applies in particular to such components of the switches concerned which are exposed to premature destruction or increased wear.

A switch of the type mentioned in the introduction is known from DE 44 32 343 A1. With the known switch, a switch lever which is swivellably retained in a housing, is used as a control. The floor of the housing is a support board on which three commercially available microswitches with press function are arranged. In this, the microswitches are arranged in an arc, spaced apart at 90° angles; each switch is connected by a spring-elastic switch clip. By way of the switch clips, the switch travel of the switch lever which is much larger than the switch travel of the microswitches, is transferred only in a limited way to the respective microswitch.

The above-mentioned embodiment of the known switch enables economic production of such a switch, using commercially available components. However, the known switch has the disadvantage that it has to be exchanged as a unit in the case of a defect of even one single microswitch. In addition, the microswitches housed in the switch housing have proven to be prone to malfunction. Finally, the known switch is difficult to install as a result of the loom of cables connected to it.

A switch similar to the switch just described is known from DE 43 32 748 A1. With this switch, optical switches instead of microswitches are provided on a support board. In comparison to the switch described above, this switch is additionally also configured in such a way that the electrical connection is established at the same time as the switch is connected to a locating device.

From DE 44 28 883 C1 a steering column assembly is known in which the problem of difficult installation as a result of the looms of cables no longer exists. In the known device, the electrical control unit is configured in the form of a printed circuit board on which sensor means, for example a steering angle sensor, are arranged. In addition, the printed circuit board comprises press contacts as well as plug-in contact elements with which the printed circuit board is coupled with the respective supply lines during installation. In addition, switches configured as steering column levers are provided which comprise lever-like control members and which point essentially in a radial direction in relation to the steering shaft. To establish an electrical connection to the central printed circuit board, each steering column lever is equipped with a further printed circuit board which is accommodated in a switch housing provided for this. At their end opposite the control means, these switch housings comprise an aperture for establishing the necessary connections with the remaining functional components of the modular unit. In this way the press contacts of the printed circuit board can be connected to establish functional contact with the contact surfaces provided on the two additional printed circuit boards.

This known embodiment of a steering column assembly first of all provides for significantly easier installation. Nonetheless the problem remains that with the known system the steering column levers have to be exchanged as a unit if a mechanical or electrical defect occurs. In addition, practical tests have shown that due to dirt or corrosion, the electrical switch elements of the steering column levers are prematurely unserviceable. In addition, it is problematic that the electrical contacts formed between the further printed circuit boards and the central printed circuit board, are affected by multiple activation and that production of further printed circuit boards on the one hand and the central printed circuit board on the other hand is expensive.

A further design of a steering column assembly for motor vehicles, in particular of a steering column switch for this steering column, is known from EP 0 687 593 A2. In this, the steering column switch is in contact with the signal transmitting device by positive connection of the housing of the steering column switch with a fixed housing part of the signal transmitting device.

Furthermore, from practical application, ignition locks for motor vehicles are known which can be inserted into a housing located below the steering wheel, in the region of the steering column. Such purely mechanical locks comprise a receptacle for the key as well as an eccentric pin as a release element.

Starting from the state of the art as discussed above, it is the object of the invention to create a steering column assembly, for arranging in the area of a steering column in a motor, vehicle which enables simple installation of the switches arranged on the steering column assembly and in which the switches can be replaced economically if a defect occurs.

SUMMARY OF THE INVENTION

According to the invention, the object derived and shown above is met in that the switch element is arranged on the support board.

The invention is characterized in that all the components necessary for carrying out the electronic or electrical functions of the steering column assembly are now only arranged on a single support board. This support board represents the central control unit and accommodates both the strip conductors necessary for electrical signal transmission and all necessary electronic components such as the control device and the switch elements. In contrast to the state of the art according to DE 44 28 883 C1, no further printed circuit boards are required. But rather, the control means which are arranged separately from the central support board, provide the desired electrical function directly by way of switch elements controlled by respective controls. This significantly simplifies production because now only one single support board needs to be provided. This embodiment provides an advantageous separation of mechanical and electrically-operating components of the steering column assembly. In this, spatial de-coupling between mechanical elements on the one hand and electrical functional elements on the other hand takes place to the extent that all electrical functions are concentrated on the support board while the mechanical control means are arranged independently of the support board, in the area of the steering column switches and/or the cylinder lock switch.

According to the invention, for the switches arranged on the steering column, the integrity of mechanical and signal-indicating part is dissolved. A switch according to the invention essentially comprises a complex, constructed from purely mechanical components, and an electrical component complex which is allocated to a support board. Both component complexes represent independent modular units. This makes it possible to install the mechanical elements of the switch separately from its electrical elements, and consequently to replace them independently from each other in the case of a defect.

Based on the separation of mechanical and electrical parts, the switch element forming the essential electrical part of the switch, can be pre-installed on the support board, arranged in a fixed way on a steering column assembly and connected with fixed cabling to the steering column. As a consequence, with a switch equipped in this way, only the mechanical part which essentially comprises the control, the control means, and a connective element to connect the switch to the locating device, needs to be coimected to the steering column assembly. In this way, installation and replacement of the switch are considerably simplified when compared with known switches.

At the same time, due to constructional separation of the electrical and mechanical parts of the steering column according to the invention, it is possible to configure both parts optimally in regard to their function and their operational safety. Thus the switch element can easily be arranged in such a way that it is protected from dirt and corrosion. In addition, switch elements can easily be used which, due to their functionality, have a near-unlimited life expectancy. In this way, with a steering column assembly according to the invention, the danger of an electrical defect is also reduced to a minimum.

Transmission of the switch signal generated as a result of moving the position of the control, from the mechanical part of the switch to the switch element, can take place in a mechanical, photoelectrical, inductive, capacitive or magnetic way.

It is further preferred that the support board carry microswitches functioning as mechanical-electrical switch elements by means of which the mechanical activation of the switch is transformed into an electrical signal. Alternatively or in addition to this, the support board can also accommodate further transducers, for example optoelectronic transducers.

According to one embodiment, the switch is configured as a steeling column switch, the steering column switch is connected, via a connective element, to a receptacle for the steering column switch in the locating device; and the control of the steering column switch is retained at the connective element. The particular effect consists of a coupling being enabled between the functions of the steering column switch with the electrical or electronic control means housed on the support board, whereby quasi an "electronic steering column switch" can be realized. In this, spatial decoupling between mechanical elements on the one hand, and electrical functional elements on the other hand, takes place to the effect that all electrical functions are concentrated on the support board, while the control means are located outside the board, in the region of the steering column switch or components interacting with it.

With a view to non-problematic disposal, the elements connected to a connective element of the steering column switch, for connection to a receptacle for the steering column switch of the locating device (which said elements comprise the mechanical part of the steering column switch) should be make from the same material as the connective element.

A further advantageous embodiment of the invention, in view of resistance to wear and ease of installation, is characterized in that the connective element is a housing which clicks into the receptacle of the locating device.

In the case of mechanical transmission of the switch signal, a preferred embodiment consists of the control means being configured as an axially-movable pin. By means of such pins, a swivelling motion can easily be converted into a purely axially directed movement. This makes it possible, while maintaining a compact design, to select a spatial allocation of a swivelably retained control and a switch element in which the switch element is positioned in a plane normally arranged to the swivelling axis of the control. With a control operated by rotation along its longitudinal axis, respective spatial allocation of the component can be attained in that the control means is a rotatably-held cam.

A form of the control means which is particularly simple and cost-effective in its realization, used for mechanical transmission of the switch signal, is characterized in that the control means is configured as a raised part shaped to the control.

According to a further embodiment, the switch is configured as a cylinder lock switch, the cylinder lock switch is connected with a lock receptacle of the locating device by way of a connective element, with the cylinder lock switch comprising a lock cylinder as a control. This embodiment is characterized in that ignition lock and locating device form an integral unit, thus significantly simplifying both production and pre-assembly and assembly of the steering column assembly. Thus, as a result of the integral unit in the shape of the enlarged locating device, all functions which are traditionally assumed by the locating device, can be combined with the function of the cylinder lock switch. The particular effect consists in a coupling of the cylinder lock function with the electrical or electronic control means accommodated on the support board, whereby quasi an "electronic ignition lock" can be realized. Here too, spatial decoupling between mechanical elements on the one hand, and electrical functional elements on the other hand, takes place to the effect that all electrical functions are concentrated on the support board, while the control means are located outside the board, in the region of the cylinder lock switch or components interacting with it.

In a further embodiment of the steering column assembly according to the invention, the control devices allocated to the steering column switch and/or the cylinder lock switch are at least partly arranged on the support board which is preferably configured as a printed circuit board, and that the control devices, depending on the switch condition of the switch element, are controllable. The configuration of the support board as a printed circuit board can be used to bring the required electrical connection in a space-efficient and safe way close to the switch element. It is particularly favorable if electronic control circuits are arranged on the support board which is configured as a printed circuit board, with the said control circuits controlling the equipment of the motor vehicle, depending on the switch condition of the switch element. Such an embodiment of the support board makes it possible to locate the control elements which depend on the switch condition of the switch element in a space-efficient way in close proximity to the switch element. In this way expensive cabling can be dispensed with. In addition, the arrangement of switching elements and control elements on a common printed circuit board offers the possibility of creating a central switch unit and control unit of the vehicle, in the region of the steering column, in the location where for reasons of optimal ergonomics, all manually operated control devices should be arranged in close proximity to the steering wheel.

A particularly preferred embodiment of a steering column assembly according to the invention is achieved in that the support board establishes the electrical connection between the connections of the steering column switch and the control devices of the vehicle allocated to the steering column switch; in that the control devices allocated to the steering column switch are at least partially arranged on the support board; in that the receptacle for the support board is radially aligned, and in that the support board can be connected to the locating device from a radial direction.

In the embodiment just described of the steering column assembly according to the invention, the support board is not just a simple electrical connection between a steering column switch and a loom of cables, but by means of the respective switches it accommodates and connects the electronic control elements necessary for activating and starting certain functions of the vehicle. In this, the support board can be a fully functional electronics printed circuit board.

In contrast to the state of the art, in the embodiment described, the control elements are arranged in close proximity to the switches activating their function. In this way, cabling of the vehicle in the steering wheel region can be considerably simplified.

At the same time, the receptacle provided, which makes it possible to plug the support board (which is equipped with control elements accordingly) into the locating device radially from a lateral direction, ensures that the support board can be installed and deinstalled very simply and quickly. Therefore, in the case of the locating device according to the invention, the support board can also comprise service-intensive components whose unimpeded access must be ensured. This modular configuration which enables simple plugging-in of the support board into the locating device of the steering column assembly according to the invention, in conjunction with the separation of mechanical and electrical components according to the invention, represents a particularly preferred embodiment. This is because as a result of the configuration, all electrical components are arranged on an easily installable and deinstallable support board, thus significantly simplifying maintenance or repair.

In this it is particularly advantageous if the support board is U-shaped. In a suitable configuration, the U-shape allows direct contact of all switches attached to the locating device. If in addition, the support board can be inserted into a slot provided in the locating device, or if it can be put on the locating device, then the locating device can be laterally slid into the slot of the locating device in the sense of a modular unit. This further facilitates exchange of the support board in the case of repair.

With the steering column assembly according to the invention, it is possible to provide further functions allocated to the steering column in that the locating device comprises a lock receptacle for a cylinder lock switch, and that the electrical connection between the connections of the cylinder lock switch and the control devices allocated to the cylinder lock switch of the vehicle is maintained by way of the support board. In this embodiment of the invention, the locating device forms a central support unit to which all essential elements necessary for operating the vehicle are attached. In this it is not only favorable if an additional lock receptacle is envisaged on the locating device, but it is equally advantageous if the locating device comprises a receptacle for the detection and control unit of a drive-away security device or an immobilizer. It can also accommodate a signal transmission device for an airbag which is arranged in the steering wheel borne by the steering column.

The easily deinstallable modular configuration of the support board according to the invention, allows a further advantageous embodiment in that the control devices allocated to the cylinder lock switch are at least in part arranged on the support board.

With a view to cost-efficient production and as much freedom in design shape as is possible, it is advantageous if the locating device according to the invention is made from a plastic material. In the case where the locating device comprises a lock receptacle, the wall of the lock receptacle can, at least in sections, be reinforced by reinforcement elements embedded in the plastic. Preferably such reinforcement elements should be made of metal. In this way it is very simple to effectively prevent any breaking out of the lock cylinder from the lock receptacle. However, it is also imaginable that by suitable selection of plastic and shaping the locating device in the region of the lock receptacle, adequate security be provided against breaking the cylinder lock off.

It can be favorable in the production of the locating device, if instead of or in combination with plastic, the locating device is made from a light-metal alloy which contains in particular magnesium and/or aluminum.

A preferred embodiment of the invention, in view of ease of installation and protection of the support board is characterized in that the support board is accommodated by a housing.

A further reduction of the individual components present in the region of the steeling wheel can be achieved in that sections of the outer walls of the locating device form the cover of the steering column which is visible from the outside.

A preferred embodiment of the steering column assembly according to the invention provides for a turning angle sensor for registering the steering angle to be provided. The electronic elements of the sensor are also arranged on the support board. In this way, a further function can be realized, namely the coupling of vehicle functions depending on the turning angle of the steering wheel.

If in addition, the support board accommodates a sensor for registering the torque acting upon the steering column, then there is an option of increasing the comfort by coupling it with a power steering function.

Finally, a further design possibility in the sense of the invention consists of the support board accommodating a receiver device for an HF radio remote control. The area behind the steering wheel is eminently suitable for this because in this location, due to the size of the window areas, HF radiation can penetrate favorably and largely without any disturbance. Thus it is not necessary to provide another place for the HF receiver in the region of the control panel.

There are a multitude of options for the design and improvement of the steering column assembly according to the invention. One embodiment of the present invention is more fully described below in conjunction with the following drawings.

DETAILED DESCRIPTION OF THE INVENTION

Figure 1:
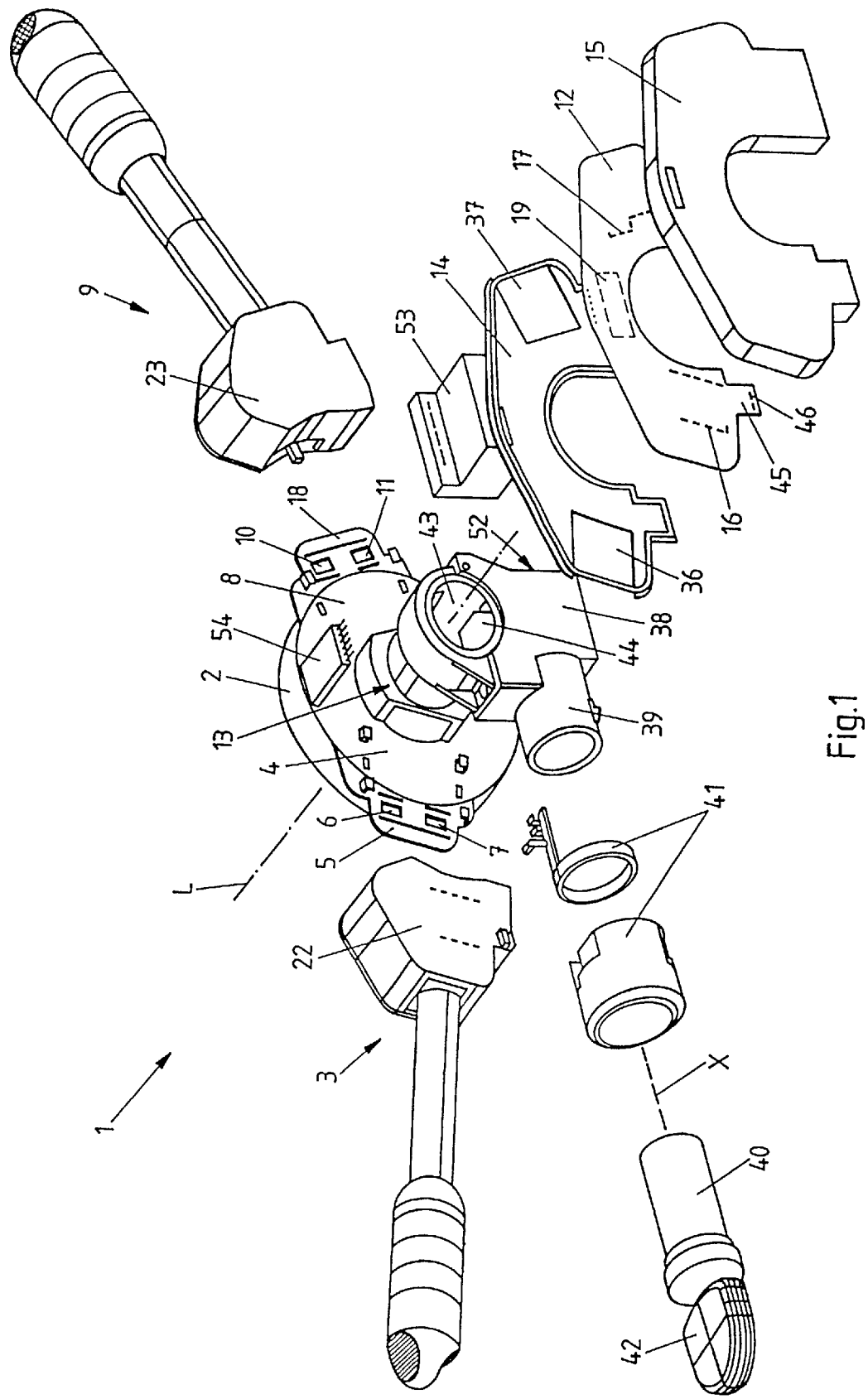
FIG. 1 shows an exploded view of an embodiment of a steering column assembly for attachment to a steering column.

The steering column assembly 1 shown in FIG. 1 comprises a central locating device 2 which can be placed upon a jacket tube (not shown) of a steering column (also not shown). To this effect, a central aperture is shaped into the locating device 2, the diameter of which corresponds with the exterior diameter of the jacket tube (not shown).

On the locating device 2, a first radially-aligned receptacle 4 is provided for a first steering column switch 3. In the region of a lateral surface of receptacle 4, in a flexible tongue 5, shaped to a lateral margin of receptacle 4, there are two click-lock apertures 6, 7. Axial-symmetrically to the longitudinal axis L of the locating device 2, there is a second receptacle 8 for a second steering column lever 9. Corresponding to receptacle 4, receptacle 8 in the region of its lateral surface comprises a flexible tongue 18 into which click-lock apertures 10, 11 have been formed.

In order to attach a U-shaped support board 12 configured as an electronics printed circuit board to the locating device 2, a slot-receptacle 13 is provided. To this effect, the support board 12 is placed in a positive-locking way into a housing comprising two housing halves 14, 15, the U-shape of which corresponds to the U-shape of the support board 12. Subsequently, the support board 12 is inserted with the surrounding housing 14, 15 from radial direction into the slot receptacle 13. In the condition inserted into the slot receptacle 13 of the locating device 2, the support board 12 is positioned into the housing halves 14, 15 surrounding it, in a plane normally positioned along the longitudinal axis L of the locating device 2.

On the side facing the housing half 14 of the support board 12, which in the condition where the support board 12 is attached to the locating device 2, is allocated to the housings 22, 23 of the steering column switches 3, 9, there are microswitches 16, 17 (shown by dotted lines). These microswitches 16, 17 can be operated by way of suitable control means of the steering column switches 3, 9. The steering column switches 3, 9 themselves do not have their own elements establishing an electrical connection. They only comprise the mechanical components necessary to activate the microswitches 16, 17. The steering column switches 3, 9 and the respective microswitches 16, 17 allocated to them jointly constitute a functional steering column switch in which constructional separation of mechanical and electrical parts is realized. This constructional separation leads to significant simplification in installing and deinstalling the steering column switch in the case of repair or similar.

By way of strip conductors (not shown) of the support board 12, the microswitches 16, 17 are connected with the electronic components arranged on the support board 12, including control devices 19. For example the vehicle's lights, turn signal indicator, windscreen wiper device etc., are controlled depending on the swivel position of the steering column switch 3 or 9.

Figure 2:
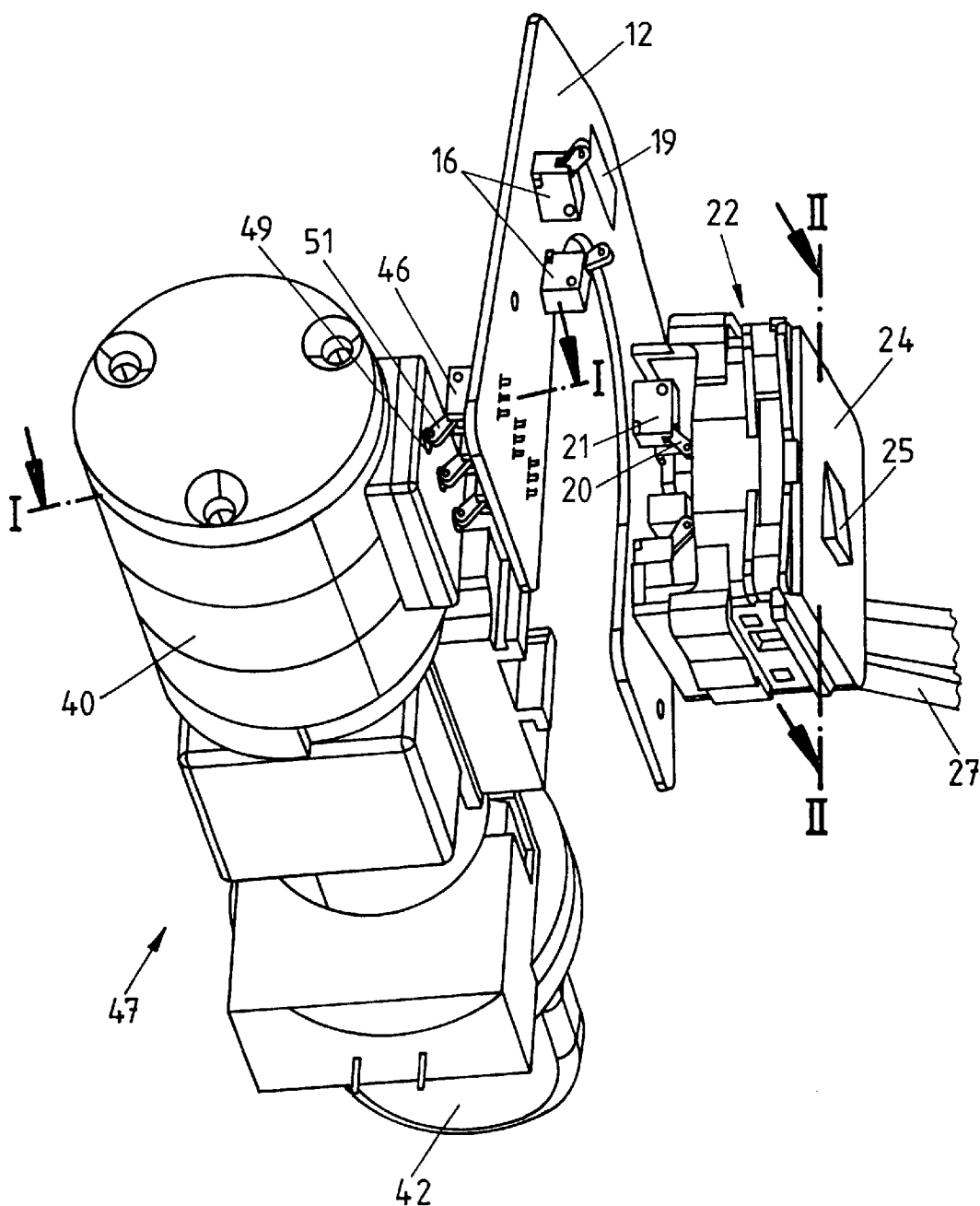
FIG. 2 shows a perspective view of embodiments of a support board, of a steering column switch and a cylinder lock switch pertaining to the embodiment of a steering column assembly shown in FIG. 1.
Figure 3:
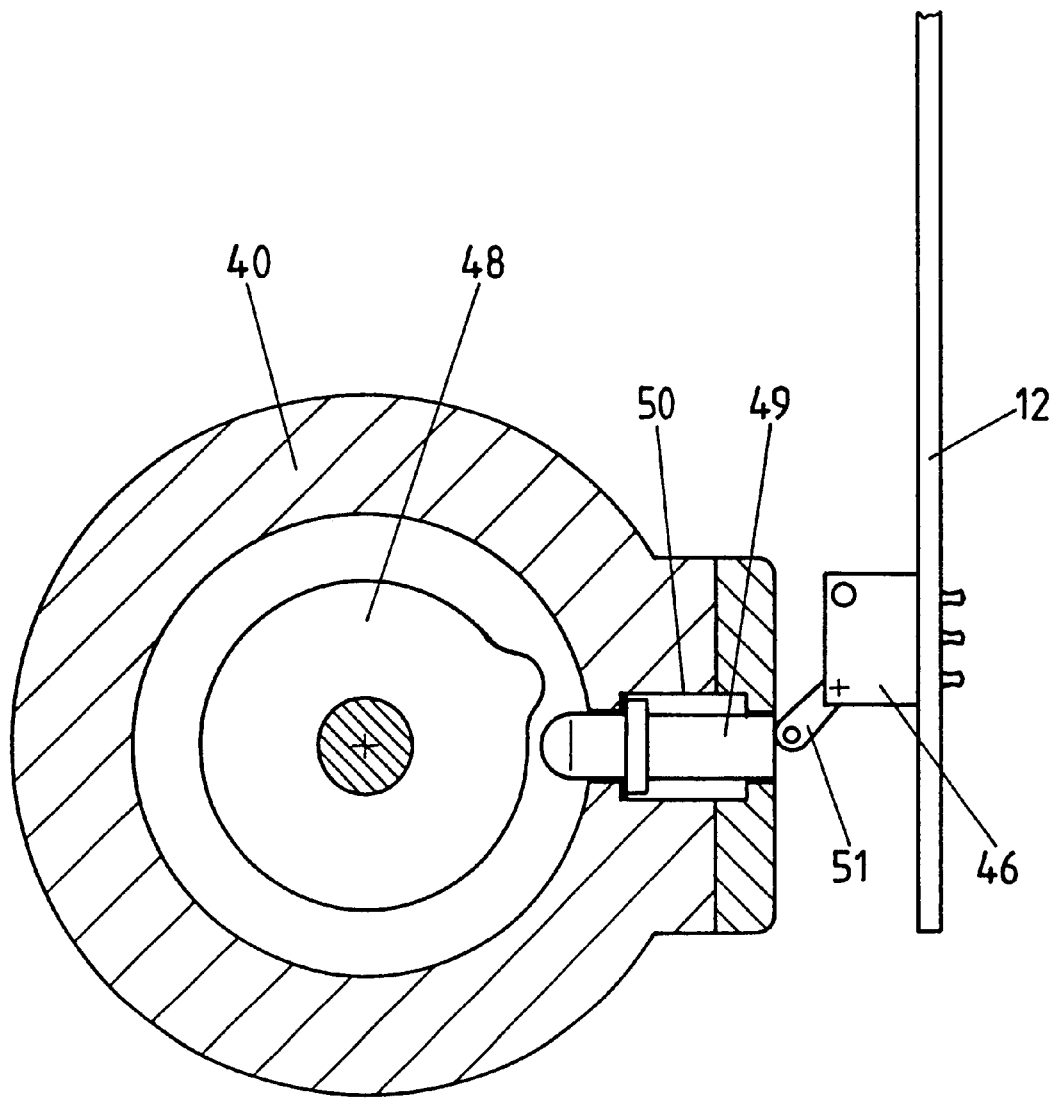
FIG. 3 is a section view along the line I—I of FIG. 2.

To activate a microswitch 16, 17, the steering column switch 3, 9 is swivelled to such an extent that a control means shaped to it, for example a pin or cam, contacts a feeler 20 of a microswitch 21 (compare FIG. 2). If the feeler 20 of the microswitch 21 is depressed, depending on the function of the respective microswitch 21, an electrical connection is established or separated.

The housing 22 or 23 of the steering column switch 3 or 9 can be inserted into the receptacles 4, 8. Laterally arranged guide means ensure that they can be inserted into the respective receptacle 4, 8 only in a particular position. The cover wall 24 allocated to the tongues 5 or 18 of the housings 22, 23 comprises click-stop protrusions 25 (compare FIG. 2). Where the housings 22 or 23 are inserted into the receptacles 4, 8, the said click-stop protrusions 25 interact with the respective click-stop apertures 6, 7 or 10, 11, in such a way that the steering column switches 3, 9 are securely retained to the locating device 2. In order to separate the steering column switch 3, 9 from the locating device 2 again, the connection between the tongues 5, 18 and the click stops of the housings 22, 23 can be undone by bending back the respective tongues 5, 18.

Figure 5:
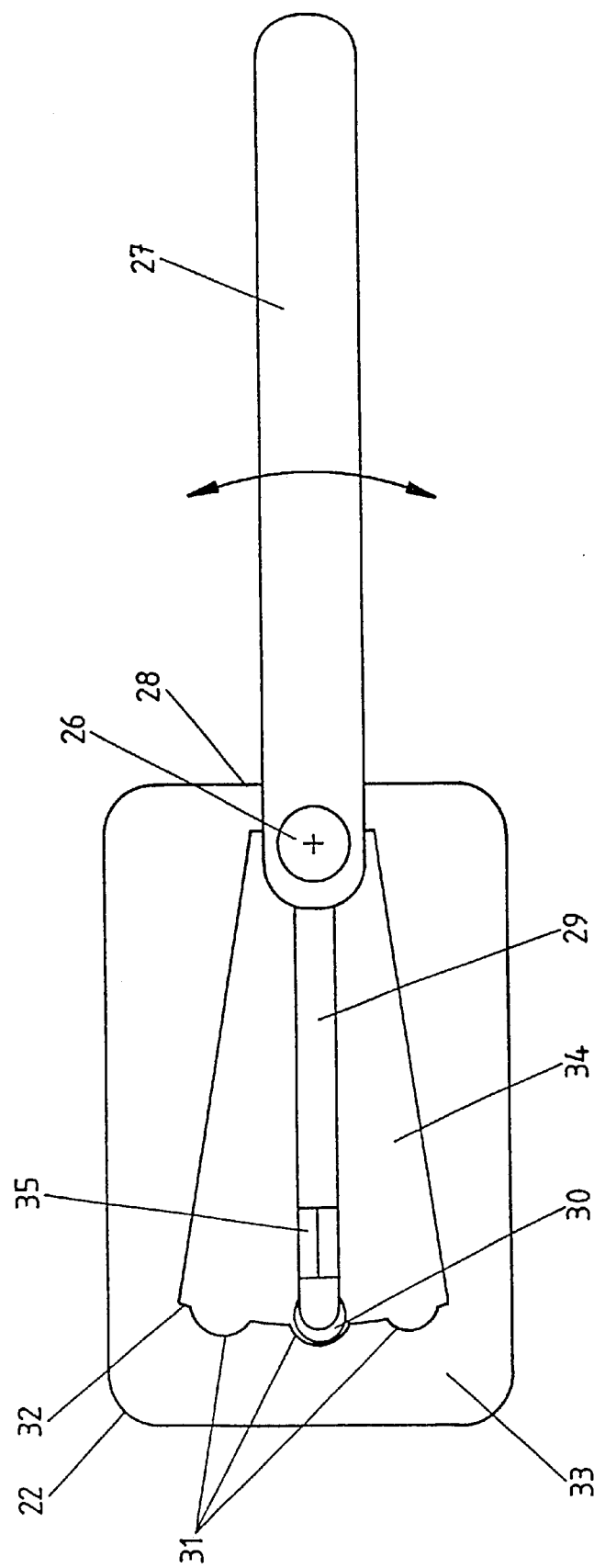
FIG. 5 shows a lateral view of the embodiment of a steering column switch.

As is depicted in FIG. 5, one control lever 27 each is swivellably retained on a swivel axis 26. The swivel axis 26 is arranged in the region of the wall 28 which, if the housing 22 or 23 is inserted into the receptacle 4 or 8, is facing outward. The wall 28 comprises a window through which the respective control lever 27 leads out of the housing 22, 23. The control lever 27 comprises an extension 29 protruding into the respective housing 22, 23.

At the tip of the extension 29 a wheel 30 is hinged in such a way that its turning axis is normally aligned to the longitudinal axis of the respective control lever 27. In this, the wheel 30 movably arranged in longitudinal direction of the control lever 27 and by means of the force of an elastic element (not shown), is pushed towards an arc-shaped marginal section 32 comprising three click stops 31 spaced apart in regular angular spacing, of a recess 34 in a closed lateral wall 33 of the housing 22, 23. The click stops 31 define three switch positions for the respective control lever 27 of the steering column switches 3, 9.

Figure 4:
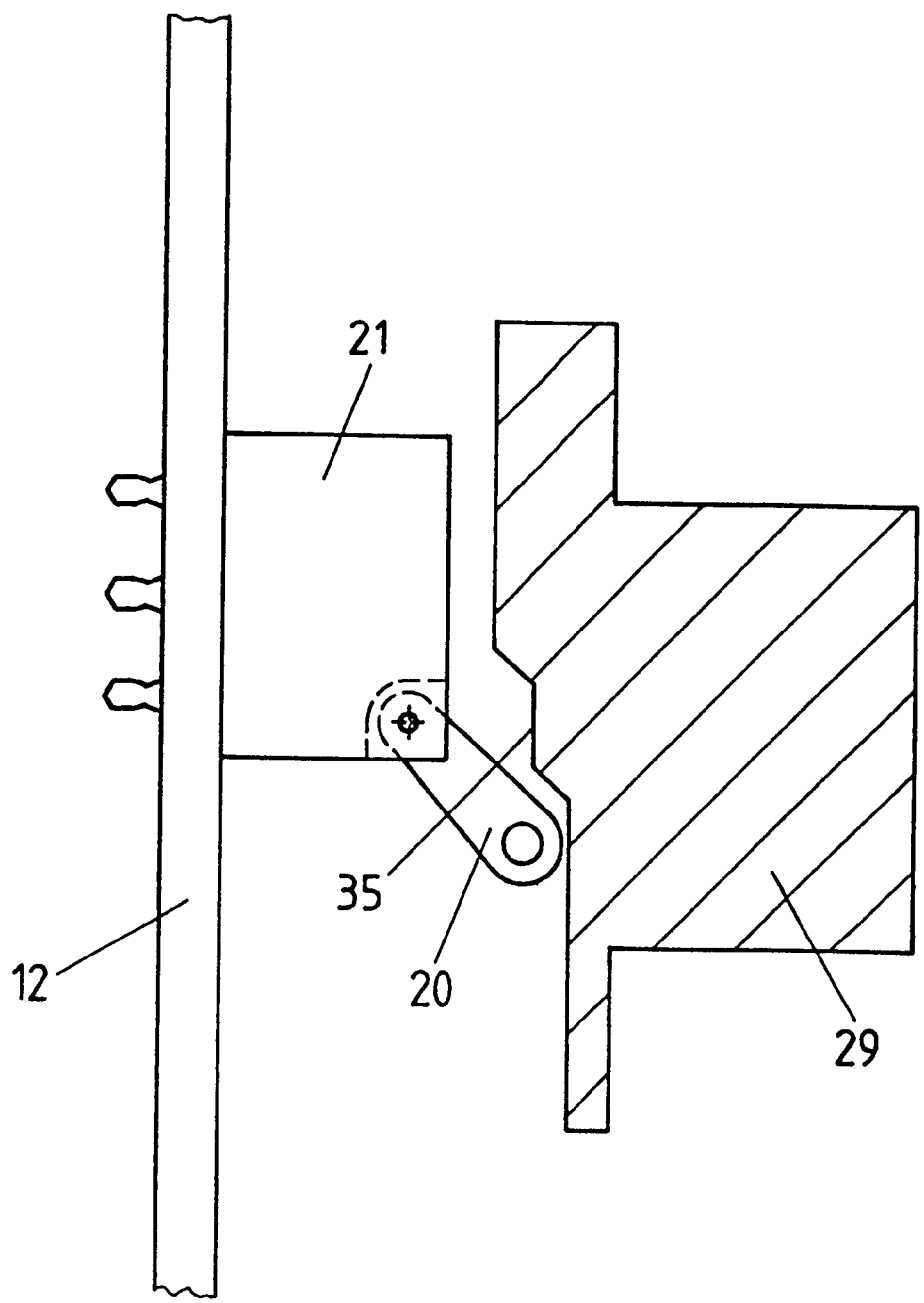
FIG. 4 is a section view along the line II—II of FIG. 2.

The surface of the extension 29 facing away from the first cover wall 24, in the region of its free end, comprises a step-shaped raised part 35 (compare FIGS. 4 and 5) whose bevelled surfaces drop towards the elongated sides of the extension 29. The second cover wall of the housings 22 or 23 comprises a window the size of which corresponds to at least the area covered by the raised part 35 during a full sweep of the control lever 27, 29.

The switch elements configured as microswitches 16, 17 on the side of the support board 12 which in a condition fixed to the locating device 2 is allocated to the housings 22, 23 (FIG. 2) are arranged in angular spacings corresponding to the angular spacings between the click stops 31.

If the support board 12 embedded in the housing halves 14, 15 is inserted into the slot-receptacle 13, and the steering column switches 3, 9 are inserted into the receptacles 4 or 8 in the locating device 2, the housing 22 or 23 covers the window 36, 37 allocated to the respective steering column lever 3, 9 of the respective housing half 14, so that the microswitches 16, 17 positioned in these windows are effectively protected from dirt.

As already mentioned, the microswitches 16, 17 are connected by way of strip conductors (not shown in detail) of the support board 12, with control devices 19 also arranged on the support board 12.

To activate one of these control devices 19, the control lever 27 is swivelled until the wheel 30 reaches the position, determined by one of the click stops 31, which corresponds to the desired function. As soon as this swivel position is reached, the feeler 20 of the microswitch 21 allocated to this position is depressed by the raised part 35 of the lever extension 29. As already mentioned, an electrical connection is established or separated in this way, depending on the function of the respective microswitch 21.

With the embodiment of a steering column assembly 1 according to the invention, the locating device 2 comprises an extension section 38 aligned coaxially to its longitudinal axis L. A lock receptacle 39 is shaped to the extension section 38. This lock receptacle 39 is shaped to the extension section 38. This lock receptacle 39 retains a lock cylinder 40 by means of a two-piece retainer 41. The lock cylinder 40 can be turned by means of a key 42 around a rotation axis X, shown in dashes in FIG. 1.

In addition, the extension section 38 of the locating device 2 comprises an aperture 43 arranged coaxially to the aperture of the locating device 2. The steering shaft (not shown) of the steering column (also not shown) leads through the aperture 43. With the key 42 removed and in the respective steering position, the steering shaft (not shown) can be locked in the traditional way by means of a wedge 44.

Beside the microswitches 16, 17 allocated to the steering column switches 3, 9, the support board 12 in the region of the section 45 of the support board 12, adjacent to the lock receptacle 39, comprises three microswitches 46 aligned in a row beside each other and spaced apart. By way of strip conductors of the support boards 12, the microswitches 46 are also connected to control devices (not shown) arranged on the support board 12. For example the starter motor (not shown) of the vehicle is controlled by the control devices.

The microswitches 46 constitute the electrical part of a cylinder lock switch 47 (compare FIG. 2) which can be activated by turning the lock cylinder 40 acting as a control. Cams 48 arranged with the lock cylinder 40 on the rotation axis of the lock cylinder 40 in various angular positions are provided to transmit the switching motion to the microswitches 46. Located on these cams 48 are the ends of pins 49 which are guided into the apertures 50 of the lock receptacle 39. In this, the apertures 50 are positioned in such a way that the other end of the respective pin 49 is in contact with the feeler 51 of the respective microswitch 46. Just as is the case with the steering column switches 3, 9, with a cylinder lock switch 47 according to the invention, the principle of separating the mechanical part from the electrical part is thus realized. This allows installation and replacement of the mechanical part (lock cylinder 40 with cams 48 and pins 49) independent from the electrical part (microswitches 46) borne by the support board 12.

Depending on the rotational position of the lock cylinder 40, the pins 49 are pushed out of the cam 48 allocated to each of them and push against the feeler 51 of the respective microswitch 46. Subsequently the microswitch establishes an electrical connection or else it separates it.

At the side of the locating device 2 located opposite the aperture of the lock receptacle 39, coaxially to the rotary axis X of the cylinder lock 40, there is a receptacle 52 for a detection and control unit 53 of a drive-away security device (not shown) or an immobilizer. For example, the detection and control unit 53 excites a transponder borne by the key 42 and depending on the signal received, for starting the vehicle, removes the drive-away lock. The electronic components required to carry out this function are also arranged on the support board 12.

In addition, the support board 12 accommodates a turning angle sensor for detecting the steering angle. Here too, the principle is realized of concentrating all elements required for electrical function on the support board 12, with only the movable mechanical components being spatially separated from them. Also, a torque registering device or a device for transmitting a control signal for an airbag can be provided, with the respective electronic or electrical control device of the said torque registering device or device for transmitting a control signal for an airbag also being positioned on the support board 12. To communicate between the electrical control unit and the functional elements of the vehicle, the support board 12 comprises a data-bus interface 54 by way of which the synchronous or asynchronous control data can be transmitted to the individual functional groups of the vehicle. Coupling with a high-frequency radio remote-control of a vehicle can also take place via the centrally arranged electrical control unit, in that the receiver for the HF remote control is also accommodated on the support board 12. This is advantageous because the region below the steering wheel is preferably accessible for HF radiation from outside.

What is claimed is:

1. A steering column assembly for arranging in an area of a steering column in a motor vehicle, comprising:
    a locating device;
    a centrally arranged support board; and
    at least one steering column switch;
    whereby the locating device comprises a receptacle for the support board and at least one receptacle, for the steering column switch;
    the steering column switch is disconnectably connected to the locating device;
    the steering column switch comprises a control; and
    the control, depending on a manually selectable position, by way of a control means, acts upon at least one switch element causing signal indication;
    wherein the at least one switch element is arranged on the support board.

2. A steering column assembly according to claim 1 wherein the at least one switch element can be operated in a mechanical, photoelectrical, inductive, capacitive or magnetic way.

3. A steering column assembly according to claim 1 wherein the at least one switch element is configured as a microswitch.

4. A steering column assembly according to claim 1 wherein the steering column switch is connected to the at least one receptacle for the steering column switch of the locating device by means of a connective element, and that the control is retained at the connective element.

5. A steering column assembly according to claim 4, wherein the control means is connected to the connective element.

6. A steering column assembly according to claim 4, wherein the connective element and elements connected to the connective element are made from identical material.

7. A steering column assembly according to claim 4, wherein the connective element is a housing having click-stop protrusions which engage click-stop apertures of the locating device.

8. A steering column assembly according to claim 1, wherein the control means is an axially-movable pin.

9. A steering column assembly according to claim 1, wherein the control is retained in a hingeable way.

10. A steering column assembly according to claim 1 wherein the steering column switch is configured as a cylinder lock switch, the cylinder lock switch is connected with a lock receptacle of the locating device by a connective element and that the cylinder lock switch comprises a lock cylinder as the control.

11. A steering column assembly according to claim 10, wherein the control means is formed by at least one cam arranged on a rotational axis of the lock cylinder and that the cam interacts with a switch element arranged on the support board.

12. A steering column assembly according to claim 1, wherein control devices allocated to the steering column switch are at least partly arranged on the support board which is configured as a printed circuit board, and that the control devices, depending on switch condition of the at least one switch element, are controllable.

13. A steering column assembly according to claim 1, wherein the support board establishes electrical connection between connections of the steering column switch and control devices allocated to the steering column switch of the vehicle; the control devices allocated to the steering column switch are at least in part arranged on the support board; the receptacle for the support board is radially aligned; and the support board is connectable with the locating device from a radial direction.

14. A steering column assembly according to claim 13, wherein the support board is U-shaped.

15. A steering column assembly according to claim 13, wherein the support board can be inserted into a slot provided in the locating device or can be put on the locating device.

16. A steering column assembly according to claim 13, wherein the locating device comprises a lock receptacle for a cylinder lock switch and in that electrical connection between connections of the cylinder lock switch and the control devices allocated to the cylinder lock switch of the vehicle, is maintained by way of the support board.

17. A steering column assembly according to claim 16, wherein the control devices allocated to the cylinder lock switch are at least in part arranged on the support board.

18. A steering column assembly according to claim 1, wherein the locating device is made from a plastic material.

19. A steering column assembly according to claim 18, wherein a wall of a lock receptacle, at least in sections, is reinforced by reinforcement elements embedded in the plastic material.

20. A steering column assembly according to claim 1, wherein sections of an outer walls of the locating device form a cover of the steering column which is visible from outside.

21. A steering column assembly according to claim 1, wherein the control means is a rotatably-held cam.

22. A steering column assembly according to claim 1, wherein the control means is a raised part shaped to the control.

23. A steering column assembly according to claim 1, wherein the control is retained in a linear-movable way.

24. A steering column assembly according to claim 1, wherein the control is retained in a rotatable way.

* * * * *